United States Patent Office 3,288,433
Patented Nov. 29, 1966

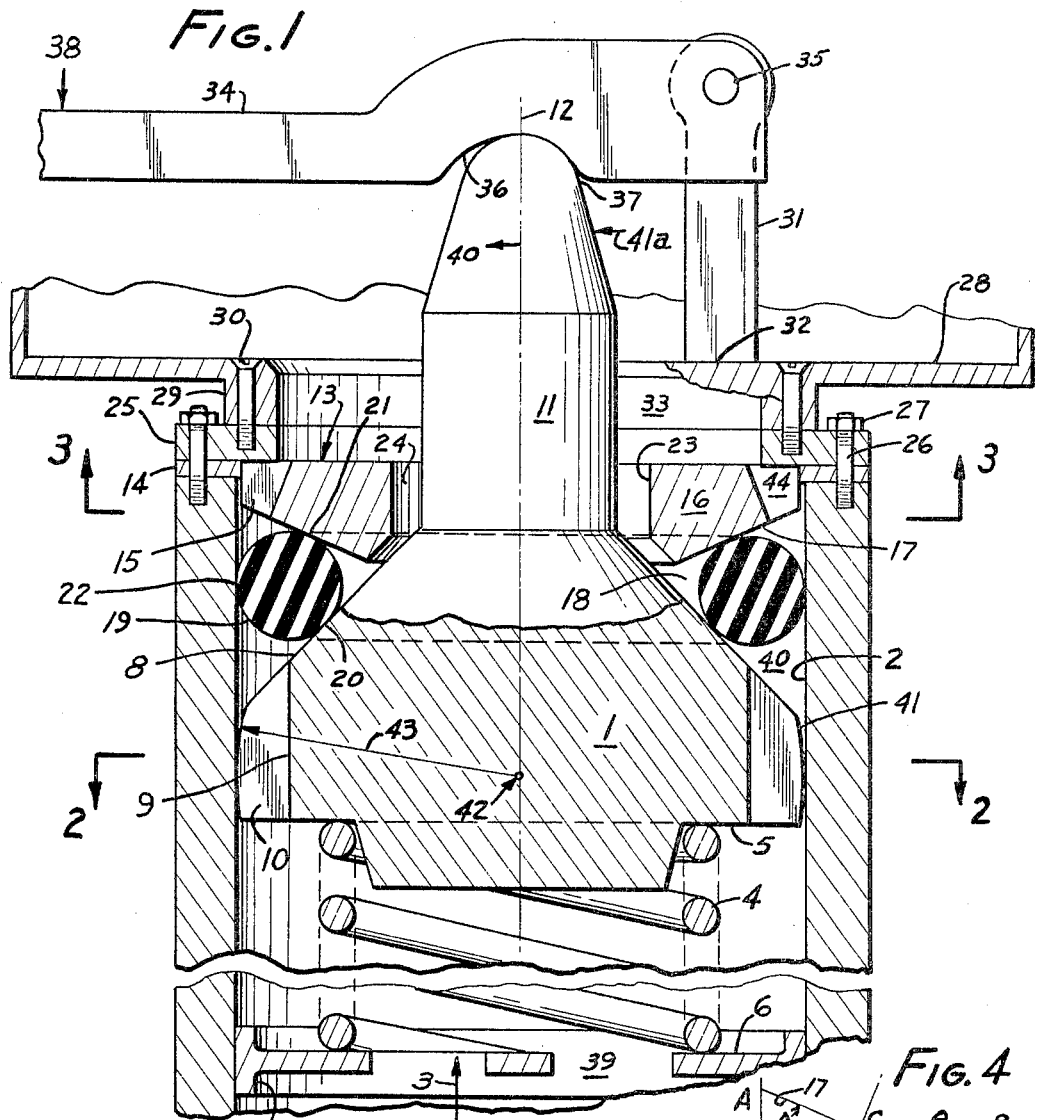

3,288,433
POPPET VALVE
Robert E. Nelson, Rte. 1, Box 215, Willow Springs,
Rosamond, Calif.
Filed Apr. 20, 1964, Ser. No. 361,171
13 Claims. (Cl. 251—317)

This invention relates to valves and more particularly to valves of a type adapted to admit or pass fluid in response to an operating device or stimulus.

The principal object of the invention is to provide such a valve which is simple in construction and efficient in its operation.

Valves for passing or admitting fluid such as lubricating oil are well know. According to a known form of such a valve, a poppet normally covers a valve seat to close the valve; and upon actuation of the poppet the valve seat is uncovered thereby permitting fluid to flow through the valve. Such prior known valves commonly require for efficient operation that the valve opening actuation or pressure be directed substantially coaxial with the longitudinal axis of the poppet.

According to the present invention there is provided a valve having a poppet with a stem arranged so that pressure or movement of the stem in a direction other than the axial operating direction will not affect the seating of the valve when in its closed position, nor will it affect the functioning of the valve when the valve is open. The invention is carried out by provision of a poppet within a bore and having a stem adapted to be moved by an operator to open the valve. This poppet can be fitted loosely within the bore and is provided with one or more passageways near the circumference thereof through which fluid under pressure behind the valve can flow.

A feature of the construction resides in the provision of a surface at the forward sides of the poppet which recedes rearwardly from near the longitudinal axis toward the wall of the bore. This receding surface is juxtaposed to an anvil member which has a surface which is at an angle to the receding surface of the poppet. Preferably the said surfaces of the poppet and of the anvil are frusto conical. A sealing ring is placed in the space between the said surfaces of the poppet and of the anvil so that the sealing action takes place at two places on the seal ring, namely the place of its contact with the receding poppet surface and the place of its contact with the inner cylindrical surface of the bore, so that the fluid does not flow past this seal member when the valve is closed.

A preferred feature resides in the ventilation or exhausting of fluid in the downstream direction both at the inside and at the outside of the sealing ring.

The foregoing and other features of the invention will be better understood from the following detailed description and the accompanying drawings of which:

FIG. 1 is a longitudinal cross-section view of an admission valve according to this invention;

FIG. 2 is a cross-section view taken at line 2—2 of FIG. 1;

FIG. 3 is a cross-section view taken at line 3—3 of FIG. 1; and

FIG. 4 is a geometrical view showing the nature of forces and stresses at the seal of the valve.

Referring to the drawing, there is shown a fluid admission valve comprising a central poppet element 1 which is fitted loosely within a bore 2 through which a fluid, ordinarily a liquid such as lubricating oil under pressure, is brought to the valve in the direction shown by arrow 3. A helical spring 4 is compressed between a shoulder 5 of the poppet and a stop means 6 which may be in the form of spaced lugs protruding inwardly from a ring nut 7 fitted or threaded within the bore. The forward part of the poppet element 1 is provided with a frusto-conical surface 8 which is a solid smooth surface extending from the position of channels 9 formed by a plurality of radial webs 10, the outer surfaces of which are in loose contact with the inner wall of bore 2. The outer circumference 41 of each of the webs 10 is in the form of an arc of a circle having a radius 43 centered at a position 42 on the longitudinal axis of the poppet. The frusto-conical surface 8 extends to the position of a central forward stem 11 which protudes forwardly from the poppet along its central longitudinal axis 12, which coincides with the longitudinal axis of the cylindrical bore when the poppet is centered therein, as shown. Around the stem 11, and forward of the conical surface 8, there is placed an anvial member 13 having an outer circumferential ring 14 to which are attached a number of radial, inwardly extending and spaced webs 15 which support an annular anvial 16 having a rear frusto-conical surface 17 facing and juxtaposed to the conical surface 8 of the poppet, and making an angle thereto. The surface 17 of the anvil extends obliquely, that is, recedes forwardly away from the longitudinal axis 12, with the portion of surface 17 away from the axis more forward than the portion of surface 17 which is closest to the axis. Conversely, the surface 8 of the poppet extends obliquely that is, recedes rearwardly away from the axis 12, with the innermost portion of surface 8 closer to the longitudinal axis at its forward portion than it is at its rearward portion.

The angle $\theta_1$ between frusto-conical surface 8 and a plane perpendicular to the longitudinal axis of the bore is preferably about 45° as I have found that this is satisfactory over a wide range of pressures for maintaining the seal when the valve is closed regardless of sidewise pressures on the valve stem. It is not essential that surface 17 make the same angle as surface 8, with a plane normal to the longitudinal axis of the bore when the poppet is centered in the bore as shown.

Within the annular groove 18 formed by the two surfaces 8 and 17 there is placed a resilient O-ring 19 of such dimension that it makes contact at three positions, one of which is a circular line at a position 20 of the conical poppet surface 8, a second of which is on a circular line at a position 21 of the conical anvil surface 17, and a third of which is a circular line at a position 22 on the inner cylindrical surface of the bore. The O-ring can be of a common type, for example a rubber or plastic which is pliable, resilient and its dimension is such that it is under some compression, with consequent flattening, at its place of contact 22 with the bore. It is also under compression from the poppet when the poppet is closed against it, so that when the valve is closed the O-ring is somewhat flattened at positions 20 and 21.

The innermost surface 23 of the anvil is spaced from the poppet and the poppet stem so as to leave an annular passageway 24 for passage of fluid between the poppet and the anvil in front of the O-ring.

The anvil member 13 may be held in its position in any suitable manner, the means shown in the drawing comprising a circular ring 25 placed over and in front of the circular lip or ring 14 of the anvil member. A plurality of studs 26 protrude forwardly from the end of the bore 2 at spaced positions through the rings 14 and 25 so that the ring 25 can be tightened down by nuts 27.

The valve as just described can be used in any desired situation. An example is shown in FIG. 1 wherein there is shown the bottom or end of a tank or receptacle 28 provided with a flange 29 which meets the forward surface of ring 25 to which it is attached by suitable means such as screws 30.

The valve may be operated in any suitable manner to depress or move the poppet away from the anvil. The means shown comprises a standard 31 mounted on a web 32 of sufficient width to support the standard and extending from the receptacle 28 inwardly into the passageway 33 through which fluid will flow when the valve is open. An arm 34 is pivoted at pivot 35 on the standard 31 which acts as a fulcrum. A domed portion 36 of the arm is proportioned to fit approximately over a forward bullet-nosed portion 37 of the valve stem 11. The valve is opened by a force applied by some suitable means (not shown) on the operating arm 34 at a position, and in the direction, as shown by the arrow 38. This can be accomplished in any suitable manner such as, for example, by a pressure operated means such as a pressure operated diaphragm or the like.

In operation, the fluid such as lubricating oil or the like, to be passed or admitted by the valve is under pressure in the bore 2 at the region 39 back of the poppet; and the pressure of this fluid is exerted on the O-ring 19 at the annular region 40 just ahead of the open channels 10 of the poppet. Since the helical spring 4 is normally continually urging the conical forward end of the poppet against the O-ring, sealing occurs at positions 20 and 22 of the O-ring with the result that there is no fluid flow past the O-ring. When, however, the operating arm is depressed by the motivating force as at position 38, the engaging surface 36 of the arm operating against the nose of the valve stem, moves the poppet rearwardly in the direction opposite the arrow 3 against the compression of spring 4, with the result that the O-ring is no longer compressed by the conical surface of the poppet and there is an annular space between conical surface 8 and the O-ring through which the fluid under pressure passes through annular passageway 24 to the receptacle 28 where it is utilized. When the pressure on the operating arm is released so that surface 36 moves forwardly again, the helical spring 4 functions to move the poppet forwardly again into contact with the O-ring to produce sealing so that no more fluid flows into receptacle 28.

By reason of the construction of this valve, the valve will remain sealed to prevent fluid flow when the stem 11 is not depressed, regardless of whether the stem happens to be pushed or moved sideways as for example in the direction of arrow 40 or in any other direction which is not along the longitudinal axis 12 in the direction opposite arrow 3. Likewise, such sideways movement or pressure when the valve is open, will not affect such open position, and the valve will remain open despite such sidewise pressure.

The poppet is actually designed so that it can tolerate some sidewise pressure or movement; and the rounding of the circumferential surfaces 41 permits rocking of the poppet about center 42 on the longitudinal axis. The provision for such rocking prevents any binding of the poppet. Thus, assuming that a sidewise force 41a tilts the poppet relative to the bore so that radius line 43 moves to be colinear with a line or plane which is perpendicular to the longitudinal axis of the bore, the circumferences of all the webs 10 will maintain substantial contact with the bore; but the valve stem will be turned so that its central axis 12 is no longer colinear with the longitudinal axis of the bore. Under this circumstance, the O-ring will no longer be exactly in contact with the circle of position 20, but nevertheless will maintain contact all around the O-ring while the O-ring is still maintaining contact at the circle of position 21 of the anvil. Under this condition, the position of contact between the poppet and the O-ring, instead of being the circle of position 20, will be somewhat elliptical. The elliptical line of contact will nevertheless be complete for the reason that the helical spring 4 pushes the poppet forwardly to maintain full contact with the O-ring when the valve is closed, due to the deformability of the O-ring. Similarly, when the valve is open, there will be an opening between the poppet and the O-ring even though the valve stem is somewhat tilted.

The spaces or channels 44 between the spaced webs 15 of the anvil serve as bleeds to release to the container any fluid which might otherwise become trapped between the bore and the region in front of the O-ring.

FIG. 4 is a geometrical diagram showing the distribution of the forces on the elements comprising the O-ring 19, the poppet, the anvil and the bore. In this figure, the lines 2, 8 and 17 represent respectively the same numbered lines in the sectional view of FIG. 1. The angles $\alpha$ and $\Delta$ are each approximately 45° as illustrated, although this angle is not critical. The line OC bisects angle $\alpha$, passing through the center of the O-ring and perpendicular to the line AB of the anvil. Cord PQ, being the cord joining the points of contact of the O-ring with the bore and with the conical poppet section, is also perpendicular to line OC. Thus, the cord PQ represents the effective thrust area of the O-ring section, and the effective line of thrust is the line OC. Hence, the forces of the bore and of the poppet on the O-ring simply tend to force it against the anvil surface at C, and without producing any tendency to move the O-ring in either direction from the point of its contact with the anvil at C.

This geometry is of considerable importance particularly when the pressure at the inlet side of the valve is substantially greater than the exit pressure, because a high relative inlet pressure may tend to distort or extrude the O-ring.

The ventilation through the anvil through openings 24 and 44 on opposite sides of the O-ring is of substantial importance; for this feature tends to prevent the extrusion of the ring through an exit passage, which might occur if there were only one such exit passage at one side of the O-ring. If the ring should become deformed in this manner, it would tend to block delivery of the fluid from the valve if there were only one exit passage. But with the substantial exit passages at both sides of the O-ring, even if it should happen for some reason, that the O-ring became extruded into one of the ventilating or exit passages, the delivery of the valve could not be impeded because it would not be possible for the ring to be extruded into both exhaust openings.

While it is preferred that the angle $\theta_2$ which the face of the anvil makes with a plane perpendicular to the longitudinal axis of the bore, be about as shown in FIG. 4, which is 22½°, such angle is not very critical except at high inlet pressures. For lower pressure work, the angle $\theta$ could be less than 22½°; and in fact, the face of the anvil could even be flat, that is in a plane normal to the longitudinal axis of the bore; and in some instances the face of the anvil adjacent the O-ring might even slope somewhat away from the normal and toward the slope of the conical surface of the poppet. In most situations the ventilation through the anvil at both sides of the O-ring should suffice to prevent deformation and extrusion of the O-ring into one of the exit channels through the anvil.

If the O-ring should tend to move away from the bore, delivery of fluid at the exit side could then occur at the outside of the O-ring. To take care of the possibility of such outside delivery of fluid, the outer ventilation channels 44 should be of substantial size, capable of effective fluid delivery.

While the surfaces 8 and 17 have been shown as frusto-conical, it should be understood that some variation from this precise geometric configuration is permissible within the scope of the invention. Thus, even if either or both of these surfaces were altered somewhat from a precise frusto-conical shape, the construction would serve to permit operation of the poppet. Such variations from precise frusto-conical surfaces would still permit the three-position contact against the O-ring resulting in sealing at the O-ring between the poppet and the bore.

It will be recognized that by my invention I have provided a poppet valve which is sensitive to very small operating pressures or movements and which can admit or shut off the flow of fluid in response thereto. Furthermore, such operation will not be attended by any jamming or failure of response of the valve to the operating device in the event of operating movements which are not precisely along the line of movement of the poppet.

Modifications and improvements within the scope of the invention may suggest themselves to those skilled in the art and the invention is not to be limited except in accordance with the scope of the appended claims.

What is claimed is:

1. A valve comprising: a bore, a poppet in the bore, means providing a channel for fluid flow past the poppet forwardly in the downstream direction near the inner wall of the bore, an anvil downstream of and in front of the poppet, said poppet having a forward surface and said anvil having a rear surface at an angle to said forward surface of the poppet, a resilient sealing ring in front of the channel means, between the rear surface of the anvil and the forward surface of the poppet and in contact with the inner wall of the bore and surrounding said exit opening and the anvil providing fluid exit passages at each side of the sealing ring whereby fluid flowing downstream past the poppet can flow through the passage inside the sealing ring and fluid existing in the region outside the sealing ring can be ventilated downstream through the passage outside the sealing ring.

2. A valve according to claim 1 in which the forward surface of the poppet and the rear surface of the anvil are each frusto-conical.

3. A valve according to claim 1 in which the angle between the forward surface of the poppet and the rear surface of the anvil is approximately forty-five degrees.

4. A valve according to claim 3 in which the forward surface of the poppet recedes rearwardly from a position near the longitudinal axis of the poppet toward the inner wall of the bore, and the rear surface of the anvil recedes forwardly from a position near the longitudinal axis of the poppet toward the inner wall of the bore.

5. A valve according to claim 1 in which the sealing ring is in contact with the bore at a first position on the ring, and in contact with the forward surface of the poppet at a second position on the ring, and in contact with the rear surface of the anvil at a third position on the ring, and a line through the cross-section of the ring which is perpendicular to the anvil at said third position is substantially perpendicular to the chord between the first and second positions, whereby when there is pressure behind the valve the resultant force of the pressure is diverted substantially along said line so that any tendency of the ring to extrude toward either the exit opening or the ventilation passage is minimized.

6. A valve according to claim 5 in which the circumferential surface areas of the poppet are curved from front to rear so that the poppet can rock in the bore when the stem is moved sideways with reference to the longitudinal axis.

7. A valve according to claim 6 in which said curved surfaces are circular arcs each having a center of curvature on the longitudinal axis.

8. A valve according to claim 1 in which means is related to the poppet to urge the poppet in the downstream direction.

9. A valve according to claim 8 in which the said means related to the poppet is a spring.

10. A valve according to claim 1 in which the valve is operable by pressure on the poppet in the rearward, upstream direction.

11. A valve comprising: a bore having a longitudinal axis, a poppet in the bore, means providing fluid flow past the poppet, an anvil having a rear surface and located downstream of and in front of the poppet, said poppet having a forward surface, a resilient O-ring in front of said means for fluid flow past the poppet, and located between the rear surface of the anvil and the forward surface of the poppet and in contact with the inner wall of the bore, fluid exit opening means through the anvil at each side of the O-ring and means urging the poppet toward the anvil to bind the O-ring between the poppet, the bore and the anvil so that the O-ring is in contact with the bore at a first position on the ring, and in contact with the forward surface of the poppet at a second position on the ring, and in contact with the rear surface of the anvil at a third position on the ring, and a line through the diameter of the cross-section of the O-ring which is perpendicular to the rear surface of the anvil at said third position is substantially perpendicular to the chord between the first and second positions, whereby fluid pressure behind the valve is directed substantially along the line toward the anvil and perpendicular to the chord so that any tendency of the O-ring to extrude is minimized.

12. A valve according to claim 11 in which the circumferential surfaces of the webs are curved from front to rear so that the poppet can rock in the bore when the stem is moved sidewise with reference to the longitudinal axis of the bore.

13. A valve according to claim 12 in which said curved surfaces are circular arcs each having a center of curvature on the longitudinal axis of the poppet.

References Cited by the Examiner

UNITED STATES PATENTS

| 1,592,747 | 7/1926 | Slagle | 137—513.7 XR |
| 2,490,511 | 12/1949 | Courtot | 251—357 XR |
| 2,706,487 | 4/1955 | Wilson | 251—175 XR |
| 2,840,336 | 6/1958 | Suthann | 251—85 |
| 2,874,996 | 2/1959 | Zajac | 251—339 XR |
| 2,912,000 | 11/1959 | Green | 251—357 XR |
| 2,918,083 | 12/1959 | Clark et al. | 251—357 XR |
| 3,008,686 | 11/1961 | Becker | 251—339 XR |
| 3,198,481 | 8/1965 | Bryant | 251—210 |

M. CARY NELSON, *Primary Examiner.*

S. SCOTT, *Assistant Examiner.*